(12) United States Patent
Chen et al.

(10) Patent No.: US 10,081,696 B2
(45) Date of Patent: Sep. 25, 2018

(54) SELF-CROSSLINKABLE POLYMER AND AQUEOUS DISPERSION COMPRISING PARTICLES OF THE SAME

(71) Applicant: Valspar Sourcing, Inc., Minneapolis, MN (US)

(72) Inventors: Xiaorui Chen, Foshan (CN); Tao Wang, Foshan (CN); Gang Duan, Northbrook, IL (US)

(73) Assignee: The Sherwin-Williams Company, Cleveland, OH (US)

( * ) Notice: Subject to any disclaimer, the term of this patent is extended or adjusted under 35 U.S.C. 154(b) by 159 days.

(21) Appl. No.: 15/042,953

(22) Filed: Feb. 12, 2016

(65) Prior Publication Data

US 2016/0159959 A1    Jun. 9, 2016

Related U.S. Application Data

(63) Continuation of application No. PCT/US2014/047619, filed on Jul. 22, 2014.

(30) Foreign Application Priority Data

Aug. 26, 2013 (CN) .......................... 2013 1 0377456

(51) Int. Cl.
| C08F 283/00 | (2006.01) |
| C08F 290/06 | (2006.01) |
| C08G 18/48 | (2006.01) |
| C08G 18/75 | (2006.01) |
| C09D 175/12 | (2006.01) |
| C08G 18/40 | (2006.01) |
| C08G 18/44 | (2006.01) |

(52) U.S. Cl.
CPC ...... *C08F 283/008* (2013.01); *C08F 290/067* (2013.01); *C08G 18/4018* (2013.01); *C08G 18/44* (2013.01); *C08G 18/4833* (2013.01); *C08G 18/755* (2013.01); *C09D 175/12* (2013.01)

(58) Field of Classification Search
CPC ............. C08F 283/008; C08F 290/067; C08G 18/4018; C08G 18/44; C08G 18/4833; C08G 18/755; C09D 175/12
USPC ....................................................... 526/307
See application file for complete search history.

(56) References Cited

U.S. PATENT DOCUMENTS

| 4,983,662 A | * | 1/1991 | Overbeek .......... C08G 18/0823 |
| | | | 524/501 |
| 4,988,762 A | | 1/1991 | Overbeek et al. |
| 5,002,998 A | | 3/1991 | Carey et al. |
| 5,147,925 A | | 9/1992 | Pears et al. |
| 6,544,592 B1 | | 4/2003 | Hesselmans et al. |
| 7,393,894 B2 | | 7/2008 | Schafheutle et al. |
| 7,829,631 B2 | | 11/2010 | Wu et al. |
| 8,216,358 B2 | | 7/2012 | Schafheutle et al. |
| 2007/0093594 A1 | | 4/2007 | Schafheutle et al. |
| 2010/0048658 A1 | | 2/2010 | Aso et al. |
| 2014/0005322 A1 | | 1/2014 | Akkerman et al. |

FOREIGN PATENT DOCUMENTS

| CN | 101544738 | | 5/2011 | |
| JP | 2005015626 | * | 1/2005 | .............. C08L 75/04 |

OTHER PUBLICATIONS

International Search Report and Written Opinion for International Application No. PCT/US2014/047619 dated Nov. 5, 2014. (12 pages).

* cited by examiner

*Primary Examiner* — Wenwen Cai
(74) *Attorney, Agent, or Firm* — Hema L. Viswanathan; James C. Scott

(57) ABSTRACT

This disclosure is directed to a self-crosslinkable polymer and and an aqueous dispersion comprising particles of the polymer. The self-crosslinkable polymer has a molecular skeleton containing urethane linkages, and a hydrazide functional group and a carbonyl functional group capable of reacting with the hydrazide functional group chemically bonded to the molecular skeleton.

18 Claims, No Drawings

SELF-CROSSLINKABLE POLYMER AND AQUEOUS DISPERSION COMPRISING PARTICLES OF THE SAME

CROSS REFERENCE TO RELATED APPLICATIONS

This application is a continuation of International Application No. PCT/US2014/047619, filed 22 Jul. 2014, which claims priority from Chinese Application No. 201310377456.5, filed 26 Aug. 2013, each of which is incorporated herein by reference in its entirety.

TECHNICAL FIELD

The present disclosure relates to a self-crosslinkable polymer and process for the preparation thereof. In particular, the present disclosure relates to a self-crosslinkable polyurethane-based polymer and to an aqueous dispersion containing particles of the self-crosslinkable polymer, which is useful in aqueous coating compositions, for example, as binder. The present disclosure further relates to process for the preparation of the aqueous coating composition, and to aqueous coating compositions comprising the aqueous dispersion.

BACKGROUND

An aqueous dispersion of polyurethane polymer has found extensive use in coating applications for its unique advantageous properties, including good adhesion to various substrates such as metal, plastics, and wood substrates, good wear resistance, elasticity and toughness and so on.

However, the polyurethane polymer has the disadvantages such as high cost, poor weatherability, poor water resistance, and poor alkali resistance. In order to improve the properties of the polyurethane polymer, it is usually modified with vinyl polymers, such as (meth)acrylic polymers. Conventionally, process for the modification comprises free radical polymerization of vinyl monomers with a urethane prepolymer containing ethylenically unsaturated functionality to form a urethane-vinyl hybrid polymer. Such kind of urethane-vinyl hybrid polymer combines the advantages of both polyurethane and vinyl polymers, and thus has an extensive prospect of application.

At present there is still a need for an improved urethane-vinyl hybrid polymer and as well an aqueous dispersion comprising particles of such hybrid polymer in the coating industry.

SUMMARY

In one aspect of the present disclosure, there is provided a self-crosslinkable polymer having a molecular skeleton containing urethane linkages, and a hydrazide functional group and a carbonyl functional group capable of reacting with the hydrazide functional group chemically bonded to the molecular skeleton. Preferably, the molar equivalent ratio of the hydrazide functional group and the carbonyl functional group is in the range of 1:2 to 2:1.

According to an embodiment of the present disclosure, the self-crosslinkable polymer disclosed herein is obtainable by
i) providing a polyurethane prepolymer represented by formula I containing an ethylenically unsaturated functional group and terminated by an isocyanate functional group; and

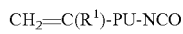    formula I ii) in the presence of hydrazine or at least one polyhydrazide, reacting the polyurethane prepolymer with a carbonyl containing ethylenically unsaturated compound represented by formula II and at least one ethylenically unsaturated compound other than formula I and formula II via free radical polymerization,

    formula II thereby forming the self-crosslinkable polymer,
wherein PU represents a polyurethane segment; $R^1$ represents H or methyl; Bg represents a divalent organic moiety in which atom of the divalent organic moiety directly attached to —CO-L is not a hetero-atom whose electronegativity is greater than that of carbon atom, or Bg is void; and L represents H or methyl.

In a further aspect of the present disclosure, there is provided an aqueous dispersion comprising at least particles of the self-crosslinkable polymer as disclosed herein, wherein the aqueous dispersion is substantially free of free hydrazine or polyhydrazide.

In a still further aspect of the present disclosure, there is provided a process for the preparation of the aqueous dispersion as disclosed herein, the process comprising
A) reacting a diisocyanate in excess with at least one polyhydroxyl compound, an ethylenically unsaturated compound having an isocyanate reactive functional group and optionally a polyhydroxyl compound with a water-dispersible group, thereby forming a polyurethane prepolymer containing an ethylenically unsaturated functional group and optional pendent water-dispersible groups and terminated by an isocyanate functional group;
B) in the presence of hydrazine or at least one polyhydrazide, dispersing the polyurethane prepolymer, a carbonyl containing ethylenically unsaturated compound and at least one ethylenically unsaturated compound other than said polyurethane prepolymer and said carbonyl containing ethylenically unsaturated compound in water, thereby forming a suspension solution; and
C) reacting the suspension solution via free radical polymerization, thereby obtaining the aqueous dispersion, wherein the aqueous dispersion is substantially free of free hydrazine or polyhydrazide.

In a still further aspect of the present disclosure, there is provided a coating composition, comprising the self-crosslinkable polymer or the aqueous dispersion as disclosed herein as a polymeric resin, and additional additives.

In a yet further aspect of the present disclosure, there is provided a substrate applied thereon with the coating composition as disclosed herein or a coating formed from the coating composition. Preferably, the substrate comprises wood-based substrates containing tannins, plastic substrates or metallic substrates.

The inventive self-crosslinkable polymer as disclosed herein has both a hydrazide functional group and a carbonyl functional group capable of reacting with the hydrazide functional group. The self-crosslinkable polymer, when comprised by a coating composition, can undergo self-crosslinking reaction to build up a network structure during or after film formation of the coating composition, thereby providing the obtained coating with improved coating properties such as wear resistance, strength, and so on.

The details of one or more embodiments of the invention will be set forth in the description below. The other features, objectives, and advantages of the invention will become apparent.

SELECTED DEFINITIONS

As used herein, the term "polymer" refers to a macromolecule that comprises a plurality of units practically or conceptually derived from molecules having lower molecular weight. Usually, the term "polymer" can describe those macromolecules having relatively high molecular weight, wherein the effect on their properties by addition or removal of one or several units is negligible (but it is not always the case, for example, where some property of polymer critically depends on the fine details of the molecular structure). In particular, in the present disclosure the effect of end groups of the polymer on its physical properties is negligible.

As used herein, the term "prepolymer" refers to a substance formed from reaction of monomers and having a relatively medium molecular weight and reactive functionalities. Such a reactive functionality comprises, but not limited to, an ethylenically unsaturated functionality such as a carbon-carbon double bond; an isocyanate functionality; a hydroxyl functionality; a carboxylic functionality; and so on.

When used in the context of "a self-crosslinkable polymer", the term "self-crosslinkable" means the ability of a polymeric molecule to participate the intramolecular and/or intermolecular crosslinking reaction to form a covalent linkage in absence of any external crosslinking agent. Generally, such crosslinking reaction takes place between the complementary reactive functionalities from one self-crosslinkable polymeric molecule alone and/or two separate self-crosslinkable polymeric molecules.

When used in the context of "a self-crosslinkable polymer", the phrase "a carbonyl functional group capable of reacting with a hydrazide functional group", refers to any carbonyl functional group that is capable of reacting with a hydrazide functional group to form a methylenimine linkage (—CH=N—), including, but not limited to, an aldehyde carbonyl group and a ketone carbonyl group.

As used herein, the phrase "an ethylenically unsaturated compound" refers to any compound containing an ethylenically unsaturated group (C=C). As used herein, the phrase, "a further ethylenically unsaturated compound" (i.e., an ethylenically unsaturated compound other than formula I and formula II) comprises any ethylenically unsaturated compound capable of undergoing free radical polymerization, including, but not limited to, styrenes, haloalkenes, vinyl acetate, and (meth)acrylates.

As used herein, the phrase "an organic moiety" refers to a portion derived from an organic compound comprising carbon, hydrogen, and optionally, oxygen, nitrogen, sulfur, phosphorus, and so on. When used in the context of the bridging group represented by "Bg", the atom of the divalent organic moiety that is directly attached to —CO-L is not a hetero-atom whose electronegativity is greater than that of carbon atom, e.g., nitrogen or oxygen atom, in order to guarantee the reactivity of the aldehyde (ketone) carbonyl group with a hydrazide. Preferably, the atom of the divalent organic moiety that is directly attached to —CO-L is a carbon atom. As a suitable example of the divalent organic moiety, —C(O)—NH—C(CH$_3$)$_2$—CH$_2$— or —C(O)—O—CH$_2$—CH$_2$—O—C(O)—CH$_2$— is provided.

When used in the context of "a self-crosslinkable polymer", the phrase "a divalent saturated hydrocarbyl" refers to any divalent saturated hydrocarbyl having a straight, branched, or cyclic chain structure and being free of an unsaturated functionality that is a carbon-carbon double bond —C=C— or triple bond —C≡C— (but a carbon-carbon double bond in an aromatic ring excluded). A suitable example of the divalent saturated hydrocarbyl comprises methylene, ethylene, propylene, tetramethylene, pentamethylene, 1,3-dimethyl propylene, 2,2-dimethyl propylene, 3-methyl pentamethylene, cyclohexene, 1-isopropyl-2,2-dimethyl propylene, or phenylene —C$_6$H$_4$—.

As used herein, the phrase "an aqueous dispersion" refers to a stable suspension of polymeric particles in an aqueous liquid medium, optionally stabilized with the aid of a suitable dispersion aid, such as a surface active agent.

When used in the context of "an aqueous dispersion", the phrase "substantially free" of some free compound, means that the aqueous dispersion contains less than 1,000 parts per million (ppm) of the compound; the phrase "essentially free" of some free compound means that the aqueous dispersion contains less than 100 parts per million (ppm) of the compound; the phrase "essentially completely free" of some free compound means that the aqueous dispersion contains less than 5 parts per million (ppm) of the compound; the phrase "completely free" of some free compound means that the aqueous dispersion contains less than 20 parts per billion (ppb) of the compound.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a", "an", "the", "at least one", and "one or more" are used interchangeably. Thus, for example, a coating composition that comprises "an" additive can be interpreted to mean that the coating composition includes "one or more" additives.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The contents of the above disclosure are not intended to describe each and every example or embodiment disclosed herein. More exemplary embodiments will be described below in more details by way of examples. At a plurality of places throughout the present disclosure, a series of examples are provided to give teaching, and these examples can be combined in any way, if possible. In each example, the exemplification is just for illustrative purpose, and shall not be interpreted as enumeration.

DETAILED DESCRIPTION

In one aspect of the present disclosure, there is provided a self-crosslinkable polymer having a molecular skeleton containing urethane linkages, and a hydrazide functional group and a carbonyl functional group capable of reacting with the hydrazide functional group chemically bonded to the molecular skeleton.

In the self-crosslinkable polymer of the invention, the "hydrazide functional group" can be derived from hydrazine or an organic hydrazide compound, and the "carbonyl functional group" that is capable of reacting with the hydrazide functional group to form a methylenimine linkage can be derived from an aldehyde or a ketone. Preferably, the molar equivalent ratio of the hydrazide functional group and the carbonyl functional group is in the range of 1:2 to 2:1.

The self-crosslinkable polymer can undergo crosslinking between different regions of the same polymeric molecule or between different polymeric molecules of the self-crosslinkable polymer during or after film formation thereof. The crosslinking is effected by reaction between the hydrazide functional group and the carbonyl functional group capable of reacting with the hydrazide functional group that are chemically bonded to the molecule skeleton to form a methylenimine linkage.

In an embodiment of the invention, the self-crosslinkable polymer may have the structure of formula IV

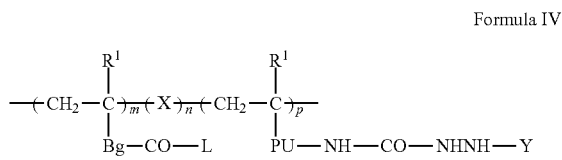

Formula IV wherein PU represents a polyurethane segment; $R^1$ represents H or methyl; Bg represents a divalent organic moiety in which the atom of the divalent organic moiety directly attached to —CO-L is not a hetero-atom whose electronegativity is greater than that of carbon atom, or Bg is void; L represents H or methyl; Y represents H or —CO—$R^2$—CONHNH$_2$ in which $R^2$ represents a divalent saturated hydrocarbyl; and X represents a structural unit derivable from an ethylenically unsaturated compound other than formula I and formula II (i.e., a further ethylenically unsaturated compound), and wherein the structural units are connected with each other in arbitrary order, the subscripts m, n and p represent the statistic sum of the corresponding structural units, respectively, with m being from 1 to 4, n being from 1 to 100, and p being from 1 to 5.

In particular, the polyurethane segment PU may have the structure of formula (V):

—COO—$R^a$—OCONH—[$R^b$—NHCOO—$R^c$—OCONH]$_q$—$R^b$—   formula V in which, $R^a$ and $R^b$ each independently represents a divalent saturated hydrocarbyl, $R^c$ represents a divalent saturated hydrocarbyl optionally having a pendent water-dispersible group, and q is in the range of 4 to 18.

The self-crosslinkable polymer as disclosed herein may be obtained by a process comprising
i) providing a polyurethane prepolymer represented by formula I containing an ethylenically unsaturated functional group and terminated by an isocyanate functional group (hereafter simply referred to as the "unsaturated polyurethane prepolymer");

CH$_2$=C($R^1$)-PU-NCO   formula I ii) in the presence of hydrazine or at least one polyhydrazide, reacting the polyurethane prepolymer with a carbonyl containing ethylenically unsaturated compound represented by formula II and at least one ethylenically unsaturated compound other than formula I and formula II via free radical polymerization,

CH$_2$=C($R^1$)-Bg-CO-L   formula II thereby forming the self-crosslinkable polymer having a molecular skeleton containing urethane linkages, and a hydrazide functional group and a carbonyl functional group capable of reacting with the hydrazide functional group chemically bonded to the molecular skeleton,
wherein, PU, $R^1$, Bg and L are defined as above.

Unsaturated Polyurethane Prepolymer

In the present disclosure, the unsaturated polyurethane prepolymer refers to the polyurethane prepolymer containing an ethylenically unsaturated functional group and terminated by an isocyanate functional group. Preferably, the unsaturated polyurethane prepolymer contains a sufficient amount of urethane linkages to provide the coating properties required for intended end applications. Such coating properties include toughness, wear resistance, and/or processability. Preferably, the unsaturated polyurethane prepolymer has on average at least about 2 urethane linkages per one prepolymer molecule, more preferably at least about 3 urethane linkages per one prepolymer molecule, and even more preferably at least about 4 urethane linkages per one prepolymer molecule. Although the upper limit of the number of urethane linkages present in the unsaturated polyurethane prepolymer is not particularly limited, and may vary depending on the molecular weight of the prepolymer, in some embodiments the unsaturated polyurethane prepolymer may contain on average less than about 30, less than about 20, or less than about 18 urethane linkages per one prepolymer molecule.

The unsaturated polyurethane prepolymer may comprise a molecular skeleton having any suitable composition and structure. The skeleton may have different compositions and structures, depending on a variety of factors, such as raw materials used for forming the skeleton, costs, and the intended end use of the prepolymer. The skeleton comprises optionally one or more further step-growth linkages, such as an amide linkage, an ester linkage, a carbonate linkage, an ether linkage, an imide linkage, an imine linkage, a urea linkage, or any combination thereof. Additionally, the skeleton of the unsaturated polyurethane prepolymer comprises optionally one or more oligomer or prepolymer segments, which may be selected from, for example, a group comprising an acrylic segment, an epoxy segment, a polyamide segment, a polyester segment, a polycarbonate segment, a polyether segment, a polyimide segment, a polyimine segment, a polyurea segment, a segment of copolymer thereof, and a combination thereof.

In an embodiment, the unsaturated polyurethane prepolymer is a linear prepolymer or a substantially linear prepolymer. In another embodiment, the unsaturated polyurethane prepolymer may be branched.

The unsaturated polyurethane prepolymer according to the present disclosure comprises a terminal isocyanate group. Preferably, the content of the terminal isocyanate group ranges from 2 to 4% by weight, and more preferably from 2.8 to 3.4% by weight relative to the weight of the unsaturated polyurethane prepolymer. The isocyanate functional group comprised by the unsaturated polyurethane prepolymer can serve as means to introduce a desirable functionality by reacting with another suitable component.

Furthermore, the unsaturated polyurethane prepolymer according to the present disclosure contains an ethylenically unsaturated functional group. The ethylenically unsaturated functional group can serve as means for the unsaturated polyurethane prepolymer to free radically copolymerize with other suitable components (such as ethylenically unsaturated monomers) to form polymer.

Additionally, the unsaturated polyurethane prepolymer according to the present disclosure may optionally contain pendent water dispersible groups (preferably salt groups). The presence of such water dispersible groups enables the unsaturated polyurethane prepolymer to stably disperse into an aqueous medium.

Preferably, the unsaturated polyurethane prepolymer may have a number-average molecular weight ranging from 200 to 1500 g/mol, preferably from 500 to 1400 g/mol, and more preferably from 1000 to 1380 g/mol. The number-average molecular weight may be determined by measuring the isocyanate content of the unsaturated polyurethane prepolymer.

The unsaturated polyurethane prepolymer as disclosed herein may be prepared from any suitable reactants by any suitable process. Preferably, the unsaturated polyurethane prepolymer is formed by reacting a diisocyanate in excess with at least one polyhydroxyl compound, an ethylenically unsaturated compound having an isocyanate reactive functional group, and optionally a polyhydroxyl compound having a water dispersible group. The reaction conditions for such a process as indicated above can be readily determined by a person skilled in the art. Preferably, the molar equivalent ratio of the isocyanate groups to the hydroxyl groups in the reactants (the NCO/OH ratio) is in the range of 1.05:1 to 2:1, more preferably 1.1:1 to 1.8:1, and even more preferably 1.3:1 to 1.7 to 1, so as to form a polyurethane polymer terminated by an isocyanate group.

To form the unsaturated polyurethane prepolymer according to the present disclosure, any suitable diisocyanate can be used. The suitable diisocyanate may comprise isophorone diisocyanate, hexamethylene diisocyanate, dodecamethylene diisocyanate, cyclohexene-1,4-diisocyanate, 4,4'-dicyclohexene methane diisocyanate, cyclopentene-1,3-diisocyanate, diphenylene methane-4,4'-diisocyanate, p-phenylene diisocyanate, toluene-2,4-diisocyanate, naphthalene-1,4-diisocyanate, diphenyl-4,4'-diisocyanate, xylylene-1,4-diisocyanate, xylylene-1,3-diisocyanate, or any combination thereof.

In some embodiments, the isocyanate compound is preferably non-aromatic. Use of the non-aromatic isocyanate is very advantageous for an outdoor coating composition. Therefore, in some embodiments, the polyurethane prepolymer according to the present disclosure is free from any structural unit derived from an aromatic isocyanate compound. As a preferred non-aromatic isocyanate compound, isophorone diisocyanate ("IPDI") and hexamethylene diisocyanate ("HMDI") are given.

To form the unsaturated polyurethane prepolymer, any suitable polyhydroxyl compound can be used, alone or in mixture. The polyhydroxyl compound may comprise a monomer, an oligomer, a polymer, or a mixture thereof.

The polyhydroxyl compound may be a polyol monomeric compound. An illustrative example of the polyol monomeric compound may comprise a diol, a triol, a polyol having four or more hydroxyl groups, or a mixture thereof. As an example of the polyol, diols having different molecular weights such as ethylene glycol, diethylene glycol, triethylene glycol, 1,2-propane diol, 1,3-propane diol, 1,4-butane diol, neopentyl glycol, 1,6-hexanediol, cyclohexane dimethanol, 2,2-bis(4'-hydroxyl cyclohexyl) propane, and higher polyols such as trialkanol alkane (e.g., trimethanol propane) or tetraalkanol alkane (e.g., pentaerythritol) can be given. These polyols may be used alone or in mixture. The diols are preferred at present.

The polyhydroxyl compound may also be a polyhydroxyl oligomer and/or a polyhydroxyl polymer. A suitable illustrative example of the polyhydroxyl oligomer/polymer may comprise polyether polyols, polyester polyols, polycarbonate polyols, polyolefin polyols, or any combination thereof. Preferably, the polyhydroxyl compound is selected from the group comprising polyether polyols, polycarbonate polyols, and combination thereof.

As an example of the polyether polyol, polyether polyols having the following formula can be used:

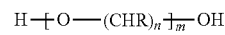

wherein R is hydrogen or an optionally substituted alkyl having up to 6 carbon atoms, n is an integer from 2 to 6, and m is an integer from 10 to 120. The specific examples thereof comprise polyethylene glycol, polypropylene glycol, polyethylene glycol-co-propylene glycol, and polytetramethylene diol. Particularly preferred is polyethylene glycol having a molecular weight of 1500 to 4000 g/mol, preferably 1800 to 3000 g/mol, and more preferably 2000 to 2500 g/mol.

As an example of the polyester polyol, polyester polyols that are prepared by esterification of a polyhydroxyl compound with a polycarboxylic acid or anhydride thereof can be used. The process for the preparation of the same is well known in the art. The polycarboxylic acids and the polyhydroxyl compounds may be aliphatic compounds, aromatic compounds, or combination thereof. Suitable polyhydroxyl compounds may comprise alkene glycols such as ethylene glycol, 1,2-propane diol, 1,3-propane diol, 1,4-butane diol, neopentyl glycol, 1,6-hexanediol, cyclohexane dimethanol, 2,2-bis(4'-hydroxyl cyclohexyl) propane, and higher polyols such as trialkanol alkane (e.g., trimethanol propane) or tetraalkanol alkane (e.g., pentaerythritol). Other polyhydroxyl compounds suitable for esterification can also be used. Suitable polycarboxyl acids may comprise those polycarboxyl acids having 2 to 18 carbon atoms, such as phthalic acid, isophthalic acid, terephthalic acid, tetrahydrophthalic acid, hexahydrophthalic acid, succinic acid, adipic acid, azelaic acid, sebacic acid, maleic acid, glutaric acid, hexachloro-heptane dicarboxylic acid, tetrachlorophthalic acid, or the like. Other polycarboxyl acids suitable for esterification can also be used.

As an example of the polycarbonate polyol, polycarbonate polyols having the following formula can be used:

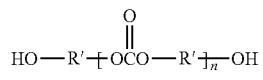

wherein R' is alkylene, and n is an integer from 10 to 120. Such polycarbonate polyols can be prepared by reacting polyol (such as 1,3-propane diol, 1,4-butane diol, 1,6-hexanediol, diethylene glycol, triethylene glycol, cyclohexane-1,4-dimethanol, 2,2-bis(4'-hydroxyl cyclohexyl) propane, neopentyl glycol, trimethanol propan, pentaerythritol, or any combination thereof) with dialkyl carbonate (such as dimethyl carbonate, diethyl carbonate, and diphenyl carbonate) or phosgene. The process for the preparation of the same is well known in the art.

As an example of the polyolefin polyol, those derived from oligomeric or polymeric olefins can be used, preferably oligomeric or polymeric olefins having at least two hydroxyl end-groups. α,ω-dihydroxyl polybutadiene is preferred.

For preparing the unsaturated polyurethane prepolymer, any suitable ethylenically unsaturated compound containing an isocyanate reactive functional group can be used. As an example of the ethylenically unsaturated compound containing an isocyanate reactive functional group, an ethylenically unsaturated compound containing a hydroxyl, thiol, or amino group can be used. Preferred examples thereof are hydroxyl containing acrylates. Hydroxyethyl (meth)acrylate, hydroxypropyl (meth)acrylate, and hydroxybutyl (meth)acrylate are currently preferred.

Optionally, water dispersibility can be provided for the unsaturated polyurethane prepolymer by any suitable means, including incorporation of an anionic water dispersible group, a cationic water dispersible group, a non-ion water dispersible group, or a combination thereof. In some embodiments of the present disclosure, the unsaturated polyurethane prepolymer usually contains a salt group and/or a salt-forming group as the water dispersible group, such as an anionic salt and/or salt-forming group(s), or a cationic salt and/or salt-forming group(s). The salt group, which may be a complete salt group or a partial salt group, can be formed by neutralizing or partially neutralizing salt-forming groups (for example, acidic groups or basic groups) on the unsaturated polyurethane prepolymer with a suitable neutralizing agent. Suitable examples of the anionic salt group comprise neutralized acid or anhydride groups, such as a carboxylate ion ($-COO^-$), a sulfate ion ($-OSO_3^-$), a phosphate ion ($-OPO_3^-$), a sulfonate ion ($-SO_2O^-$), a phosphonite ion ($-POO^-$), a phosphonate ion ($-PO_3^-$), and a combination thereof. Suitable examples of the cationic salt group comprise an ammonium group, a phosphonium group, a sulfonium group, and a combination thereof. Examples of the neutralizing agent suitably used to form an anionic salt group comprise, but not limited to, inorganic or organic bases, such as amine, sodium hydroxide, potassium hydroxide, lithium hydroxide, ammonia, or a mixture thereof. A tertiary amine is a currently preferred neutralizing agent. Examples of the neutralizing agent suitably used to form a cationic salt group comprise, but not limited to, inorganic or organic acids, such as formic acid, acetic acid, hydrochloric acid, lactic acid, sulfuric acid, and a combination thereof. In some embodiments of the present disclosure, a carboxylate ion neutralized by N,N-dimethylethanolamine is currently preferred.

A suitable method for incorporating the above-mentioned salt or salt-forming groups into the unsaturated polyurethane prepolymer can be readily determined by a person skilled in the art. For example, for the preparation of the unsaturated polyurethane prepolymer, a polyhydroxyl compound having an anionic salt or salt-forming group, such as bis(hrydoroxylmethyl)propanoic acid or a salt thereof is used.

Preparation of Self-crosslinkable Polymer

According to the present disclosure, the inventive self-crosslinkable polymer is obtainable by reacting the unsaturated polyurethane prepolymer as disclosure herein with a carbonyl containing ethylenically unsaturated compound and at least one further ethylenically unsaturated compound in the presence of hydrazine or at least one polyhydrazide via free radical polymerization.

The hydrazine or polyhydrazide compound present in the reaction system undergoes a condensation reaction with the isocyanate end groups of the unsaturated polyurethane prepolymer, thereby incorporating the hydrazide functional group into the self-crosslinkable polymer. In an embodiment of the present disclosure, the amount of the isocyanate groups of the unsaturated polyurethane prepolymer are in excess with respect to the amount of the hydrazine or polyhydrazide compound used, so that the reaction product is substantially free of free hydrazine or polyhydrazide compound.

Any suitable hydrazine or polyhydrazide compound can be used herein. Examples of the polyhydrazide compound comprise dihydrazides of dicarboxylic acids having 2 to 12 carbon atoms such as ethanedioic acid, propanedioic acid, butanedioic acid, pentanedioic acid, hexanedioic acid, heptanedioic acid, octanedioic acid, and decanedioic acid; carbonic acid dihydrazide; N,N'-diaminoguanidine; alkylene dihydrazides, such as N,N'-diaminopiperazine; arylene dihydrazides, such as phenylene dihydrazide and naphthylene dihydrazide; and dihydrazides of dialdehydes or diketones. In embodiments of the present disclosure, hydrazine hydrate is currently preferred.

The monomers that take part in the radical polymerization reaction for chain growth comprise, in addition to the unsaturated polyurethane prepolymer, the carbonyl containing ethylenically unsaturated compound. Any suitable carbonyl containing ethylenically unsaturated compound can be used in the present disclosure. Examples of the carbonyl containing ethylenically unsaturated compound comprise methyl vinyl ketone, (meth)acrolein, diacetone (meth)acrylamide, diacetone (meth)acrylate, mixed esters of aliphatic diols with (meth)acrylic acid and acetoacetic acid, or mixture thereof. Preferably, the carbonyl containing ethylenically unsaturated compound comprises diacetone (meth)acrylamide, ester of ethylene glycol with (meth)acrylic acid and acetoacetic acid, or mixture thereof Additionally, the monomers that take part in the radical polymerization reaction for chain growth further comprise the further ethylenically unsaturated compound. As used herein, the further ethylenically unsaturated compound comprises any ethylenically unsaturated compound capable of undergoing free radical polymerization, but excludes the unsaturated polyurethane prepolymer and the carbonyl containing ethylenically unsaturated compound as disclosed herein. Suitable examples of the further ethylenically unsaturated compound comprise styrenes, such as styrene, α-methyl styrene, vinyl toluene, and vinyl naphthalene; halogenated olefins, such as vinyl chloride, vinylidene chloride, vinyl fluoride, tetrafluoroethylene, and hexafluoropropylene; allyl ethers, such as allyl anisole; vinyl acetate; vinyl versarate, such as VeoVa 10; acrylonitriles, such as acrylonitrile, and methacrylonitrile; $C_{1-16}$ alkyl esters of (meth) acrylic acid; alkoxyalkyl (meth)acrylates; or the combination thereof.

According to the requirements of application in the field of coatings, the further ethylenically unsaturated compound as used herein is incorporated to advantageously provide the self-crosslinkable polymer and the aqueous dispersion thereof with the desirable mechanical properties, good film-formation and adhesion behaviors. Preferably, the further ethylenically unsaturated compound is selected from styrenes, vinyl acetate, and alkyl (meth)acrylates. More preferably, the further ethylenically unsaturated compound is selected from $C_{1-16}$ alkyl esters of (meth)acrylic acid. Suitable examples of the (meth)acrylate comprise, but not limited to, methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)

acrylate, cyclohexyl (meth)acrylate, decyl (meth)acrylate, isodecyl (meth)acrylate, lauryl (meth)acrylate, isobornyl (meth)acrylate, octyl (meth)acrylate, nonyl (meth)acrylate, or mixtures thereof. In an embodiment of the present disclosure, the (meth)acrylate comprises methyl (meth)acrylate, butyl (meth)acrylate, or mixture thereof.

In view of the stability of the self-crosslinkable polymer, the amounts of the hydrazine or polyhydrazide compound and the carbonyl containing ethylenically unsaturated compound in the self-crosslinkable polymer may usually be relatively low. Preferably, the amount of the hydrazine or polyhydrazide compound, calculated in the bound form, in the self-crosslinkable polymer is in the range of 0.2 to 1%, preferably 0.5 to 0.8%, by weight relative to the total solids weight of the self-crosslinkable polymer. The amount of the carbonyl containing ethylenically unsaturated compound, calculated in the bound form, in the self-crosslinkable polymer is in the range of 0.5 to 5%, preferably 1 to 3%, by weight relative to the total solids weight of the self-crosslinkable polymer.

The amount of the further ethylenically unsaturated compound (for example, the alkyl (meth)acrylates) in the self-crosslinkable polymer can be adjusted according to the practical requirements (such as the film-formation behavior, mechanical properties, and so on). The amount of the further ethylenically unsaturated compound in the self-crosslinkable polymer may usually be relatively high. In particular, the amount of the further ethylenically unsaturated compound, calculated in the bound form, in the self-crosslinkable polymer is in the range of 30 to 70%, preferably 35 to 65%, and more preferably 40 to 60%, by weight relative to the total solids weight of the self-crosslinkable polymer.

In a particularly preferred embodiment of the present disclosure, the self-crosslinkable polymer can be prepared in a process as described below.

Firstly, a diisocyanate which is provided in excess is reacted with at least one polyhydroxyl compound, an ethylenically unsaturated compound having an isocyanate reactive functional group, and optionally a polyhydroxyl compound having a water-dispersible group to form a polyurethane prepolymer containing an ethylenically unsaturated functional group and terminated by an isocyanate functional group. According to the present disclosure, the molar equivalent ratio of the isocyanate groups of the diisocyanate to the hydroxyl groups is at least 2:1 in order to form the polyurethane prepolymer terminated by an isocyanate functional group. The reaction process can be monitored by measuring the residual NCO content. The measurement of the NCO content may be performed by using any conventional method known in the art, such as the method by titration with n-butylenediamine in toluene (ASTM D 2572-82).

Preferably, the reaction proceeds as illustrated in Scheme 1:

Scheme 1

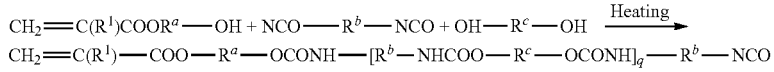

wherein each of $R^a$, $R^b$, $R^c$, and q is defined as above.

As indicated above, the addition reaction is carried out at an elevated temperature (for example, a temperature between 40 and 85° C.) in no need of addition of any catalyst, thereby producing the polyurethane prepolymer, $CH_2=C(R^1)$-PU-NCO. The endpoint of the reaction may be determined by the NCO content.

According to the present disclosure, the reaction product may be directly used in the next step without need for further processing.

Then the polyurethane prepolymer produced in the previous step is reacted with a carbonyl containing ethylenically unsaturated compound at least one further ethylenically unsaturated compound via free radical polymerization, in the presence of hydrazine or at least one polyhydrazide, to form the self-crosslinkable polymer according to the present disclosure.

The suitable conditions for the above polymerization reaction can be readily determined by a person skilled in the art. Preferably, the polymerization reaction can be initiated by a free-radical initiator at an elevated temperature (for example, 50 to 90° C.).

Any free-radical initiator known in the art may be used. Suitable examples of the free-radical initiator comprise peroxides, such as cumene hydroperoxide, t-butyl hydroperoxide, di-t-butyl peroxide, dioctyl peroxides, t-butyl peroxypivalate, t-butyl peroxyisononanate, t-butyl peroctoate, t-butyl peroxyneodecanate, di-(2-ethylhexyl)peroxydicarbonate, and diisotridecyl peroxydicarbonate; azo compounds, such as azobis(isobutyronitrile) and azo bis(4-cyano-pentanoic acid); and conventional redox systems. Preferably, azobis(isobutyronitrile) is used as the free-radical initiator.

In particular, the polymerization reaction proceeds as illustrated in Scheme 2:

Scheme 2

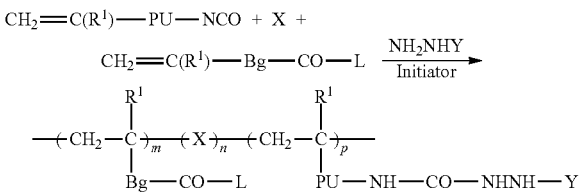

wherein each of PU, $R^1$, Bg, L, X, Y, m, n, and p is defined as above.

The self-crosslinkable polymer obtainable by the process as described above contains a hydrazide functional group and a carbonyl functional group capable of reacting with the hydrazide functional group.

The free-radical polymerization reaction may be effected by any suitable manner, including but not limited to solution polymerization, emulsion polymerization, suspension polymerization, or the like. Preferably, the free-radical polymerization is effected via suspension polymerization.

The thus-obtained aqueous dispersion comprises at least the self-crosslinkable polymer according to the present disclosure, wherein the aqueous dispersion is substantially free of free hydrazine or polyhydrazide.

According to the present disclosure, the aqueous dispersion containing the self-crosslinkable polymer may be prepared in a process comprising:

A) reacting a diisocyanate in excess with at least one polyhydroxyl compound, an ethylenically unsaturated compound having an isocyanate reactive functional group and optionally a polyhydroxyl compound with a water-dispersible group, thereby forming a polyurethane prepolymer containing an ethylenically unsaturated functional group and optionally a pendent water-dispersible groups and terminated by an isocyanate functional group;

B) in the presence of hydrazine or at least one polyhydrazide, dispersing the polyurethane prepolymer, a carbonyl containing ethylenically unsaturated compound and at least one further ethylenically unsaturated compound in water, thereby forming a suspension solution; and C) reacting the suspension solution via free radical polymerization, thereby obtaining the aqueous dispersion, wherein the aqueous dispersion is substantially free of free hydrazine or polyhydrazide.

Process for the preparation of an aqueous dispersion of polymer is generally known in the art. For example, the process for suspension polymerization that is known to a person skilled in the art may be used for the preparation of the aqueous dispersion according to the present disclosure. Generally, the process for suspension polymerization may comprise the steps of dispersing a polymerizable monomer in water, optionally with aid of a suitable dispersant under agitation, to form a suspension, and initiating polymerization of the monomer by, for example, using an initiator.

In an embodiment of the present disclosure wherein the unsaturated polyurethane prepolymer has a water dispersibility, the polyurethane prepolymer, the carbonyl containing ethylenically unsaturated compound and the further ethylenically unsaturated compound are directly dispersed in water in the presence of hydrazine or at least one polyhydrazide to form a suspension solution, without need for any additional dispersant, and then a free-radical initiator is used to initiate the polymerization.

The size of the polymeric particles in the thus-formed aqueous dispersion may be measured in terms of the z-average particle size which is well known in the art. The z-average particle size can be determined according to the dynamic light scattering method by using, for example, a Malvern ZETASIZER™ 3000HS microscopic particle-size analyzer from Malvern Instruments, Ltd. The z-average particle size of the polymeric particles of the aqueous dispersion according to the present disclosure is at most 150 nm, more preferably less than 120 nm, and even more preferably less than 110 nm. However, the z-average size of the polymeric particles is preferably at least 10 nm, more preferably at least 20 nm, and even more preferably at least 50 nm. In a preferred embodiment, the particle size of the polymeric particles of the aqueous dispersion according to the present disclosure ranges from 20 to 150 nm.

In another aspect, the present disclosure provides a coating composition comprising a self-crosslinkable polymer according to the present disclosure or an aqueous dispersion containing particles of the self-crosslinkable polymer as a polymeric resin, and additional additives.

The self-crosslinkable polymer according to the present disclosure used in the coating composition as a polymeric resin may undergo a crosslinking reaction to form a network structure during film formation of the coating composition.

If desired, the coating composition according to the present disclosure may optionally include additional additives that do not adversely affect the coating composition or a resultant coating obtained therefrom. Suitable additives include, for example, those that improve the processability or manufacturability of the composition, enhance coating aesthetics, or improve a particular functional property or characteristic of the coating composition or the cured composition, such as adhesion to a substrate. Additives that may be included are, for example, carriers, emulsifiers, pigments, fillers, anti-migration aids, anti-microbials, extenders, lubricants, coalescent agents, wetting agents, biocides, plasticizers, antifoaming agents, colorants, waxes, anti-oxidants, anticorrosion agents, flow control agents, thixotropic agents, dispersants, adhesion promoters, UV stabilizers, scavenger agents, thickeners, defoamers, pH adjusters, film formation aids, organic solvents, or combinations thereof. Each optional ingredient can be included in a sufficient amount to serve its intended purpose, but not in such an amount that adversely affect a coating composition or a cured coating resulting from the composition.

In still another aspect, the present disclosure provides a substrate, applied thereon with the coating composition according to the present disclosure or a coating formed from the coating composition. Preferably, the substrate comprises wood-based substrates containing tannins, plastic substrates or metallic substrates. Most preferably, the substrate comprises wood-based substrates containing tannins.

The coating composition comprising the self-crosslinkable polymer according to the present disclosure or the aqueous dispersion according to the present disclosure is particularly suitable to be applied on the wood-based substrates containing tannins, for being substantially free of free hydrazine or polyhydrazide, which otherwise may cause discoloration.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available, and used directly as received.

List of Raw Materials

| Name | Description | Supplier/Manufacturer |
|---|---|---|
| PEG N220 | Polyethylene glycol, Mw 2000 | Dow Chemical Co. |
| PCDL M112 | Aliphatic polycarbonate diol, Mw 1000 | Perstorp Group |
| IPDI | Isophorone diisocyanate | Bayer |
| DMPA | Bis(hydroxylmethyl) propanoic acid | GEO |
| HEMA | Hydroxyethyl methacrylate | Mitsubishi Rayon Co. Ltd. |
| MMA | Methyl methacrylate | Dow Chemical Co. |
| BA | Butyl acrylate | Dow Chemical Co. |
| DMEA | N,N-dimethylethanolamine | Dow Chemical Co. |
| HAHD (80 wt %) | 80 wt % solution of hydrazine hydrate in water | Zhuzhou Chemical Group Co., Ltd., Hunan, China |
| DAAM | Diacetone acrylamide | Kyowa Hakko Kogyo Co., Ltd., Japan |
| AIBN | Azobis(isobutyronitrile) | Commercially available |
| DI water | Deionized water | |

Preparation of Unsaturated Polyurethane Prepolymer

Under the protection of $N_2$, 40.000 g of PEG N220 and 60.000 g of PCDL M112 were loaded into a four-necked flask reactor equipped with a thermometer, a top stirrer, and a gas inlet at a temperature ranging from about 50° C. to about 60° C. Then, 168.750 g of IPDI was added into the reactor. The reaction mixture was heated to about 85° C., and kept at this temperature for about 60 minutes. Thereafter, 42.880 g of DMPA was added into the reaction mixture, and the temperature was kept at about 85° C. for another 60 minutes. Finally, 15.320 g of HEMA were added into the reaction mixture, and the temperature was kept at about 85° C. for still another 60 minutes. When the NCO % content was measured to be 3.1%±0.3%, the reaction was quenched, and a polyurethane prepolymer containing an ethylenically unsaturated functional group and terminated by an isocyanate functional group (also referred to as "the unsaturated polyurethane prepolymer") was obtained in the reactor. The number-average molecular weight of the thus-obtained unsaturated polyurethane prepolymer was calculated to be about 1362 g/mol.

Preparation of Self-crosslinkable Polymer

After the unsaturated polyurethane prepolymer in the reactor was cooled down below a temperature of about 70° C., 247.000 g of MMA, 120.000 g of BA, and 38.729 g of DMEA were added into the reactor and kept at about 70° C. for about 15 minutes. 6.010 g of HARD (80 wt %), 870.000 g of DI water, and 16.237 g of DAAM were loaded into an agitated vessel, and maintained at 12.8° C. Then, the content of the reactor was slowly added into the vessel in 45 minutes. The whole process for dispersing was carried out at a temperature of below 30° C. and an agitation rate of above 1500 rpm. Thereafter, 6.896 g of AIBN were loaded into the vessel, and agitation was continued for 30 minutes to form a suspension.

Under the protection of $N_2$, 174.182 g of the suspension were loaded into another four-necked flask reactor equipped with a thermometer, a top stirrer, and a gas inlet, and also 110.000 g of DI water were added into the reactor. Then, the temperature of the reaction system was elevated to about 85° C., and maintained at such temperature, after which the rest of the suspension was added dropwise in 3 to 4 hours. Thus, an aqueous dispersion containing particles of the self-crosslinkable polymer was obtained. The aqueous dispersion was measured to have a Z-average particle size of 102 nm.

Coating Composition

The thus-obtained aqueous dispersion was mixed with the above-mentioned additional additives to provide a coating composition. The coating composition formed a film at room temperature (about 23° C.), which was found to have improved properties such as wear resistance. The improved properties were at least partly due to self-crosslinking of the self-crosslinkable polymer during the film formation.

While the invention has been described with respect to a number of embodiments and examples, those skilled in the art, having benefit of this disclosure, will appreciate that other embodiments can be devised which do not depart from the scope and spirit of the invention as disclosed herein.

What is claimed:

1. A self-crosslinkable polymer having a molecular skeleton containing urethane linkages, a hydrazide functional group and a carbonyl functional group capable of reacting with the hydrazide functional group;
   wherein the self-crosslinkable polymer is obtained by
   i) providing a polyurethane prepolymer represented by formula I containing an ethylenically unsaturated functional group and terminated by an isocyanate functional group; and $$CH_2 \!=\! C(R^1)\text{-PU-NCO} \qquad \text{formula I}$$

ii) in the presence of hydrazine or at least one polyhydrazide, reacting the polyurethane prepolymer with a carbonyl containing ethylenically unsaturated compound represented by formula II and at least one ethylenically unsaturated compound other than formula I and formula II via free radical polymerization, $$CH_2 \!=\! C(R^1)\text{-Bg-CO-L} \qquad \text{formula II}$$

thereby forming the self-crosslinkable polymer,
   wherein PU represents a polyurethane segment; $R^1$ represents H or methyl; Bg represents a divalent organic moiety in which atom of the divalent organic moiety directly attached to —CO-L is not a hetero-atom whose electronegativity is greater than that of carbon atom, or Bg is void; and L represents H or methyl.

2. The self-crosslinkable polymer according to claim 1, wherein the polyurethane segment has an average polymerization degree in the range of 4 to 18.

3. The self-crosslinkable polymer according to claim 1, wherein the at least one polyhydrazide is selected from the group consisting of aliphatic compounds having two or more hydrazide groups, aromatic compounds having two or more hydrazide groups, and combinations thereof.

4. The self-crosslinkable polymer according to claim 3, wherein the at least one polyhydrazide is selected from the group consisting of adipic acid dihydrazide, isophthalic acid dihydrazide, and mixtures thereof.

5. The self-crosslinkable polymer according to claim 1, wherein the carbonyl containing ethylenically unsaturated compound is selected from the group consisting of methyl vinyl ketone, (meth) acrolein, diacetone (meth)acrylamide, diacetone (meth)acrylate, mixed esters of aliphatic diols with (meth)acrylic acid and acetoacetic acid, and mixtures thereof.

6. The self-crosslinkable polymer according to claim 5, wherein the carbonyl containing ethylenically unsaturated compound is selected from the group consisting of diacetone (meth)acrylamide, ester of ethylene glycol with (meth)acrylic acid and acetoacetic acid, and mixtures thereof.

7. The self-crosslinkable polymer according to claim 1, wherein the at least one ethylenically unsaturated compound other than formula I and formula II is selected from the group consisting of styrenes, halogenated olefins, allyl ethers, vinyl acetate, vinyl versarate, acrylonitriles, $C_{1-16}$ alkyl esters of (meth)acrylic acid, alkoxyalkyl (meth)acrylates and combinations thereof.

8. The self-crosslinkable polymer according to claim 7, wherein the $C_{1-16}$ alkyl esters of (meth)acrylic acid is selected from the group consisting of methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, lauryl (meth)acrylate, isobornyl (meth)acrylate, octyl (meth)acrylate, nonyl (meth)acrylate and mixtures thereof.

9. The self-crosslinkable polymer according to claim 1, wherein the self-crosslinkable polymer has the structure of formula IV

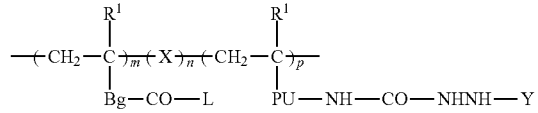

formula IV wherein PU represents a polyurethane segment; $R^1$ represents H or methyl; Bg represents a divalent organic moiety in which the atom of the divalent organic moiety directly attached to —CO-L is not a heteroatom whose electronegativity is greater than that of carbon atom, or Bg is void; L represents H or methyl; Y represents H or —CO—$R^2$—CONHNH$_2$ in which $R^2$ represents a divalent saturated hydrocarbyl; and X represents a structural unit derived from the ethylenically unsaturated compound other than formula I and formula II, and wherein the structural unit X and the structural units derived from formula I and formula II are connected with each other in arbitrary order, the subscripts m, n and p represent the statistic sum of the corresponding structural units, respectively, with m being from 1 to 4, n being from 1 to 100 and p being from 1 to 5.

10. The self-crosslinkable polymer according to claim 9, wherein PU has the structure of formula (V):

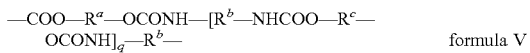

formula V in which, $R^a$ and $R^b$ each independently represents a divalent saturated hydrocarbyl, $R^c$ represents a divalent saturated hydrocarbyl optionally having a pendent water-dispersible group, and q is in the range of 4 to 18.

11. The self-crosslinkable polymer according to claim 1, wherein the polyurethane prepolymer is formed by reacting a diisocyanate in excess with at least one polyhydroxyl compound and an ethylenically unsaturated compound having an isocyanate reactive functional group.

12. The self-crosslinkable polymer according to claim 11, wherein the diisocyanate is selected from the group of isophorone diisocyanate, hexamethylene diisocyanate, dodecamethylene diisocyanate, cyclohexene-1,4-diisocyanate, 4,4'-dicyclohexene methane diisocyanate, cyclopentene-1,3-diisocyanate, diphenylene methane-4,4'-diisocyanate, p-phenylene diisocyanate, toluene-2,4-diisocyanate, naphthalene-1,4-diisocyanate, diphenyl-4,4'-diisocyanate, xylylene-1,4-diisocyanate, xylylene-1,3-diisocyanate and combinations thereof.

13. The self-crosslinkable polymer according to claim 12, wherein the diisocyanate is selected from the group consisting of isophorone diisocyanate, diphenylene methane-4,4'-diisocyanate and combinations thereof.

14. The self-crosslinkable polymer according to claim 11, wherein the at least one polyhydroxyl compound is selected from the group consisting of polyether polyols, polyester polyols, polycarbonate polyols, polyolefin polyols and combinations thereof.

15. The self-crosslinkable polymer according to claim 14, wherein the at least one polyhydroxyl compound is selected from the group consisting of polyether polyols, polycarbonate polyol and combinations thereof.

16. The self-crosslinkable polymer according to claim 11, wherein the ethylenically unsaturated compound having an isocyanate reactive functional group is selected from the group consisting of ethylenicallly unsaturated compounds having a hydroxyl functional group, a mercapto functional group, an amino group and combinations thereof.

17. The self-crosslinkable polymer according to claim 16, wherein the ethylenically unsaturated compound having an isocyanate reactive functional group is selected from the group consisting of hydroxyethyl (meth)acrylate, hydroxypropyl (meth)acrylate and combinations thereof.

18. The self-crosslinkable polymer according to claim 1, wherein the prepolymer further has pendent water-dispersible groups.

* * * * *